United States Patent [19]
Samuelsen et al.

[11] 3,848,806
[45] Nov. 19, 1974

[54] THROTTLING VENTURI VALVE

[75] Inventors: Bryan Samuelsen; Alfred A. Liebman, both of Woodland Hills, Calif.

[73] Assignee: Rockwell International Corporation, El Sequndo, Calif.

[22] Filed: Apr. 30, 1973

[21] Appl. No.: 355,389

[52] U.S. Cl............ 239/265.11, 239/265.19, 60/242
[51] Int. Cl...................... B63h 11/00, B64d 33/04
[58] Field of Search..... 239/265.11, 265.13, 265.19; 60/230–232, 242; 181/33

[56] References Cited
UNITED STATES PATENTS

| | | | |
|---|---|---|---|
| 2,865,169 | 12/1958 | Hausmann | 239/265.13 |
| 3,069,841 | 12/1962 | Moore | 239/265.19 |
| 3,402,894 | 9/1968 | Wynosky et al. | 239/265.19 |
| 3,504,860 | 4/1970 | Wilson | 239/265.19 |
| 3,527,407 | 9/1970 | Mueller et al. | 239/265.11 |

*Primary Examiner*—Lloyd L. King
*Attorney, Agent, or Firm*—L. Lee Humphries; Robert G. Upton

[57] ABSTRACT

A throttling sonic venturi valve apparatus consists of a venturi housing, a movable throat pintle, and a pulse motor operated positioning mechanism to position the throat pintle. The valve controls gaseous fluid flow to thrusters, or the like, by utilizing pressure and temperature sensing devices upstream of the venturi valve and feeding the pressure-temperature variables to an interpolator which provides electrical pulse signals to drive the step pulse motor, thereby adjusting the venturi throat pintle within the venturi housing to provide a constant mass flow rate (LBS/SEC) through the valve.

8 Claims, 3 Drawing Figures

THROTTLING VENTURI VALVE

BACKGROUND OF THE INVENTION

1. Field of the Invention

Rocket engine thrusters which utilize, for example, gaseous hydrogen and gaseous oxygen mixtures suffer from varying inlet pressures to the thrusters, resulting in inconsistent thrust output. Therefore, a need arises in providing a predictable means to control the mixture ratio and flow of the gaseous hydrogen and gaseous oxygen to these thrusters. Propellant systems supplying these thrusters could have widely varying propellant pressures and temperatures at the thruster inlet. Therefore the purpose of this invention is to provide a means which assures a steady mass flow rate of gaseous propellants into the thrusters.

2. Prior Art

A U.S. Pat. issued to McSherry et al. No. 3,059,425, discloses a means to control the thrust of a solid propellant rocket motor. A movable pintle is positioned within the throat area of the solid propellant rocket motor which is controlled by the pressure within the combustion chamber, the pressure being routed back to a servo mechanism which repositions the pintle dependent upon the desired output thrust of the solid propellant rocket. This device, however, is disadvantaged in that there is no means to compensate for temperature variation within the combustion chamber which has a direct effect on the weight of the flow of gas, i.e., as the temperature rises, the combustion gases get less dense, thus the opening in the throat region, defined by the pintle and the walls of the throat, should be widened to compensate for the density of the combustion gases. Thus, it can be seen that the pressure actuated pintle is less accurate with the absence of a combustion temperature sensing means.

U.S. Pat. No. 3,073,112 also discloses an apparatus for axially positioning a pintle restriction in the throat region of a rocket exhaust nozzle to vary its effective exit area. Means is provided for sensing the internal pressure or rate of burning of a container solid propellant charge and feeding back this information to an electronic device which sends signals to control the servo-drive mechanism to position the pintle within the throat region of the rocket motor, thereby regulating the thrust of the motor. This device, like the foregoing patent, suffers in that it senses pressure only, therefore precise control of the outgoing thrust cannot be maintained due to the varying temperatures within the combustion chamber.

Summary of the Invention

A throttling venturi valve is utilized to control gaseous propellant flow to thrusters over wide temperature and pressure excursions. Metering of the gaseous propellant is accomplished by positioning a contoured pintle in a sonic venturi to vary the effective flow area. Since flow at sonic velocity is directly proportional to flow area and upstream pressure, and inversely proportional to the square root function of the propellant temperature, a constant flow condition may be maintained by varying the flow area corresponding to propellant inlet pressure and temperature. This is accomplished by placing a pressure and temperature sensing device immediately upstream of the venturi valve and feeding the pressure and temperature variables to an electronic interpolator, i.e., computer, which, in turn, provides electrical pulse signals to drive a step servo motor operated venturi throat pintle. The pintle is positioned mechanically in the throat region by the step servo motor to provide flow area corresponding to propellant inlet pressure and temperature conditions.

Therefore, it is an object of this invention to provide a throttling venturi valve which provides gaseous propellant at a constant flow rate to a thruster.

More specifically, it is an object of this invention to provide a throttling venturi valve that regulates gaseous propellants at a constant mass flow rate to a thruster by sensing both the upstream pressure and the upstream temperature of the incoming gaseous propellants, feeding this information to an interpolator which, in turn, feeds electronic signals to a servo motor that positions a sliding pintle within the throat region of the venturi valve so as to regulate the outgoing gaseous propellants to a thruster.

Therefore, an advantage over the prior art is the ability to sense both temperature and pressure more precisely to control the flow of gaseous propellants to rocket engine thrusters, or the like.

Yet another advantage in the throttling venturi valve is the elimination of large pressure regulators and costly propellant conditioners while maintaining a more accurate flow control than could otherwise be attained.

Still another advantage over the prior art is the pintle positioning mechanism which is operable while being completely isolated from the flow of gaseous propellants through the nozzle portion of the valve.

The above noted objects and advantages of the present invention will be more fully understood upon a study of the following detailed description in conjunction with the detailed drawings.

Figure 1:
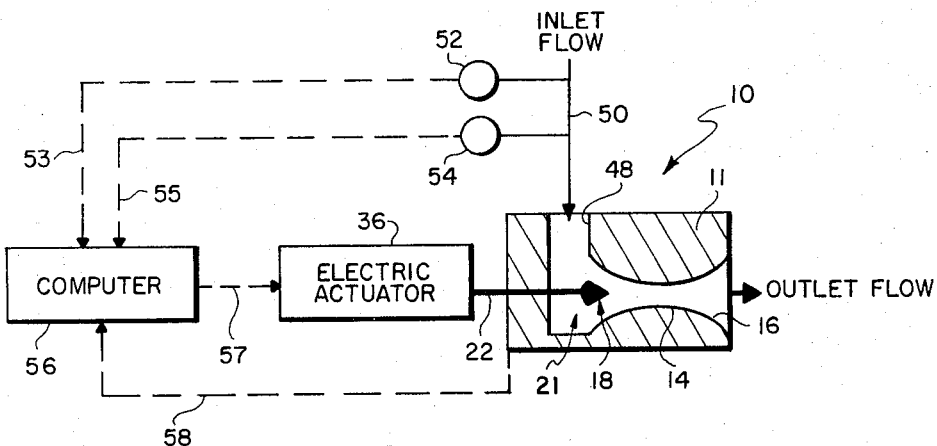
FIG. 1 is a schematic view of the venturi flow valve and associated components.

Description of the Preferred Embodiment of the Invention

The throttling venturi valve generally designated as 10 is comprised of a nozzle housing 11 which defines a mixing chamber 21, a throat region 14, a nozzle portion 16, and a movable pintle 18. Inlet flow of gaseous fluids or propellants is fed into mixing chamber 21 through inlet 48 of nozzle body 11 via conduit 50. The condition of the flow of gaseous propellant, such as gaseous hydrogen and gaseous oxygen, through conduit 50 is sensed by a temperature sensing means 52 which could be, for example, a thermocouple and a pressure sensing means 54 such as, for example, a pressure transducer. Signals from the thermocouple 52 and pressure transducer 54 are routed to interpolator or computer 56 through leads 53 and 55. The computer 56, in turn, sends electronic signals through lead line 57 to an electric actuator or step servo motor 36 mechanically connected to housing 11 of the venturi valve. The servo step motor 36 is mechanically engaged with a stem 22 of the pintle 18 so as to axially position the pintle 18 into or away from the throat region 14 of the nozzle housing 11. A feedback line 58 feeds pintle position information back into the computer so that the computer may compare the actual position of the pintle with the information fed in from the temperature and pressure sensing means.

Figure 2:
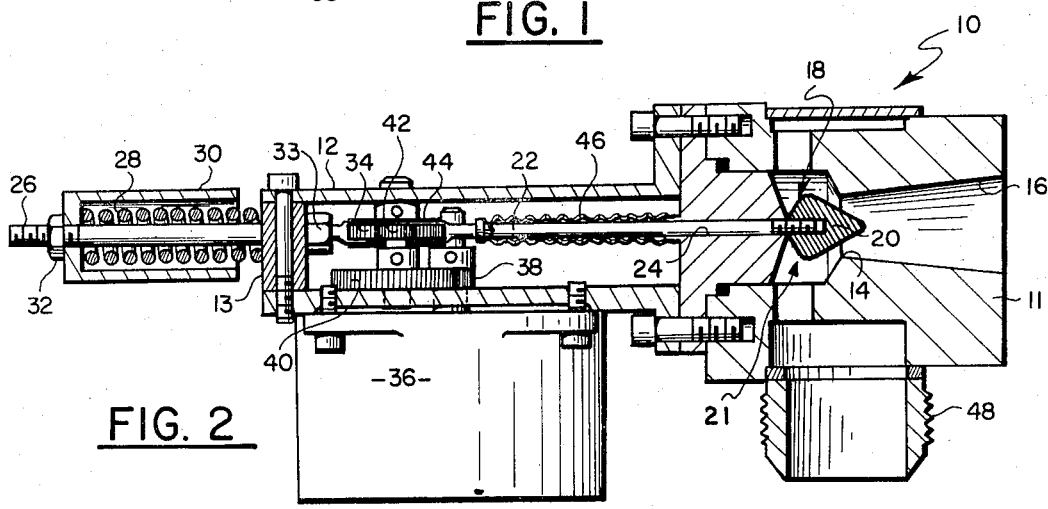
FIG. 2 is a partially cutaway, side elevational view of the throttling venturi valve.

Referring now to FIG. 2, the cross sectional view of the throttling venturi valve 10 is depicted showing the details of the valve. Nozzle housing 11 has connected at one end a rear housing section 12. Rear housing section 12 provides support for the step servo motor 36 which is attached to the side wall of the housing. A gaseous propellant inlet 48 feeds gaseous propellant into the region aft of the throat area 14. The inlet pressure, for example, may range between 400 and 1,200 psia. Gaseous propellant is, of course, metered through the throat region into the nozzle 16, and thence to a rocket engine thruster or the like (not shown).

The pintle 18 is comprised of a stem portion 22 which is supported by bearing 24 in nozzle housing 11. The head 20 of the pintle 18 is a contoured cone, the walls of the cone, for example, define approximately a 60° included cone surface for flow metering of the gaseous propellants through the nozzle to produce a linear change in flow rate versus axial position of the pintle 18. At the opposite end 26 of the stem 22 is a mechanism which minimizes backlash in the driving mechanism. The means to minimize backlash comprises a restraining spring 28 which surrounds the stem and is supported at one end of rear face housing 12 and at the other end by a restraining stop nut 32. A spring retaining cover 30 surrounds the spring and provides a maximum travel stop for the stem 26, the stop being the base of the cover 30 striking the rear face 13 of housing 12. A second stop nut 33 is positioned within the housing 12 to limit the rearward travel of the pintle 18. The spring primarily compensates for pressure effects on the pintle since the loads may be considerable (400 to 1,200 psia), thus reducing the actuation loads on the servo motor 36. The servo step motor 36 is connected to the stem 22 in the following manner. A drive gear 38 is connected to the shaft of the step motor, the drive gear 38 being in engagement with an idler gear 40 which is linked to a pinion gear 42. The pinion gear is engaged with a pinion rack which is attached to the stem 32 of the pintle 18. A bearing 44 supports the opposite side of the pinion rack on the stem to assure total contact of the pinion gear with the pinion rack. A bellows seal 46 surrounds the stem 22. The bellows are attached to the stem 22 just forward of the servo step motor drive mechanism and are attached at their other end adjacent the nozzle housing 11. The bellows seal may be, for example, a hydroformed bellows of an appropriate size and spring rate. The bellows and the bias-loading spring 28 are incorporated to supply a unidirectional net force on the driving mechanism at all times, minimizing the force requirement of the servo step motor on the pintle 18 during operation of the valve.

The step servo motor 36 may be, for example, a permanent magnet type having rapid acceleration of fine resolution of approximately 200 steps per revolution with relatively powerful output torque. The motor should exhibit good dynamic damping characteristics. The foregoing parameters, in addition to a 3.3:1 mechanical gear ratio (gears 38, 40, and 42), will produce sufficient valve response and resolution.

Figure 3:
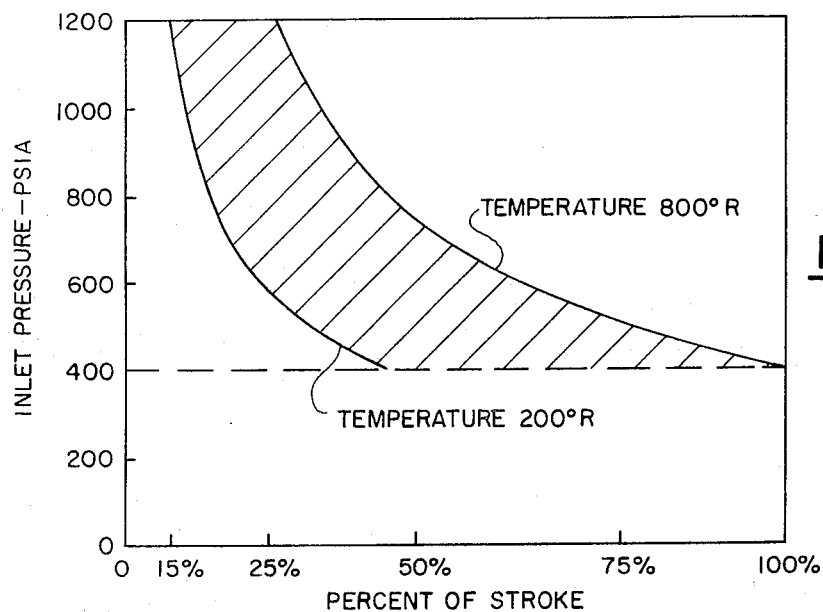
FIG. 3 is a chart indicating a typical operating range of the sonic venturi valve.

The control scheme for the venturi valve 10 is considered an open loop concept since only the upstream gaseous propellant conditions are sensed and no feedback from the downstream or thruster parameters is incorporated. The open-loop concept permits the control device to be prepositioned for, for example, thruster start-up and the valve response need only be sufficient to follow the relatively slow (one-fourth cycle per second) main stage temperature and pressure fluctuations typical in gaseous propellant rocket engine systems. For example, a total pressure drop across the valve of only 15 percent has been experimentally accomplished using a valve of the foregoing configuration. The back pressure (downstream of the valve) is fixed by the downstream conditions, thruster chamber pressure, injector and valve resistance, flow rate, and propellant temperature. Since chamber pressure and flow rate are virtually constant through the valve, the back pressure varies as a result of the temperature effect on the system pressure drop. This pressure drop can amount to a variation of over 100 psi. For example, in the preferred embodiment, the venturi valve 10 is designed to operate in a pressure range of between 400 psia and 1,200 psia, and a temperature range of between 200° Rankine and 800° Rankine. The chart shown in FIG. 3 depicts the valve operating ranges. The bottom line indicates the percent of stroke of the sliding pintle 18 when the valve is operating at a range between 400 and 1,200 psia and between 200° – 800° Rankine. At the minimum inlet pressure and the maximum inlet temperature corresponding to maximum flow areas (400 psia and 800° Rankine), the venturi is designed to just flow sonic at the throat 14. An infinitesimally small shock will occur at the throat 14 with virtually no pressure losses across it, and maximum downstream compression recovery will occur. For example, recoveries of 0.85 percent have been predicted and experimentally achieved utilizing a valve of the preferred embodiment just described. For higher inlet pressures, a lower recovery is required to make the valve outlet pressure match the system back pressure. This is accomplished by supersonic expansion downstream of the throat region 14 and a subsequent normal shock causing a total pressure loss, followed by subsonic compression. The lower the back pressure, the greater the normal shock loss becomes.

The pressure recovery requirements for the venturi valve 10 are shown in FIG. 3 at a function of inlet pressure and temperature. This data indicates that maximum recovery is required only over a portion of the gaseous flow region. This allows the pintle 18 to be designed for a shorter stroke. Although this valve typically was designed to operate over a 400 to 1,200 psi pressure range, lower pressures would be easier to accommodate because of its lower pressure loading on the pintle.

One of the foremost advantages of this invention is the instantaneous start-up response afforded by the open-loop control logic. Since the valve is always exposed to the gaseous supply temperature and pressure, even during periods of non-operation, the control area can be preset before the thruster valves (not shown) are open. This is a significant feature for pulsing type thrusters (not shown) because these thrusters are frequently pulsed for short durations (50 to 100 milliseconds). Lack of gaseous propellant control for pulses of this length may have a significant impact upon the overall propellant utilization. The valve preset condition may be achieved through a continuous low level power supply to the venturi valve, thus prepositioning the pintle 18 within the throat region 14 of the valve 10.

Mainstage response of the electro-mechanical venturi valve 10 is determined by the response of the thermocouple 52, the pressure transducer 54, the computer 56, response time, and the motor mechanical drive capability. The total pintle full stroke response, for example, approaches one-half a second in the preferred valve. System pressure changes and temperature variations are attenuated by the mass of the feed system such that a maximum change could not occur in less than one second in most cases. Therefore, the electro-mechanical device will be entirely capable of following any rocket engine or the like mainstage propellant condition variations.

The ability to compensate for all gaseous propellant temperature effects is a distinct advantage. Because an electronic computer is used, it is relatively simple to account for thruster thermo-chemical and efficiency variations with propellant conditions. Propellant crosstemperature effects can also be handled together with the real gas effects of compressibility and specific heat ratio changes. These secondary effects have been shown to amount to a band of 4 percent (plus or minus 2 percent) which, if neglected, can pose severe requirements on a venturi valve and its mechanical accuracy to maintain an overall control band of plus or minus 3 percent. However, for the electro-mechanical concept as just described, the only errors contributing to the control accuracy are those in the mechanics of the system, i.e., the sensor precision, controller resolution, and pintle control position.

It will, of course, be realized that various modifications can be made in the design and operation of the present invention without departing from the spirit thereof. Thus while the principal, preferred construction and mode of operation of the invention have been explained and described in what is now considered to represent its best embodiment, it should be understood that within the scope of the appended claims, the invention may be practiced otherwise than as specifically illustrated and described.

I claim:

1. A throttling venturi valve apparatus for metering gaseous fluids therethrough comprising:
    a housing, said housing forming a mixing chamber, throat portion, and a nozzle portion at a first end of said housing;
    a movable pintle positioned upstream of said throat portion in said mixing chamber, said pintle having a stem portion;
    conduit means connected to said housing to direct said gaseous fluid into said mixing chamber;
    driver means connected to said stem portion of said movable pintle to move said pintle axially into and out of said throat portion, thereby closing down or opening up the passage between said pintle and said throat portion;
    temperature and pressure sensing means in said conduit to monitor gaseous fluid upstream of said throttling venturi valve;
    computer means linked to said temperature and pressure sensing means in said conduit, said computer being additionally linked to said driver means to cause said driver means to move said pintle dependent upon the temperature and pressure of said upstream gaseous fluid, thereby regulating the flow of gaseous fluids through said venturi valve; and
    feedback means linked between said movable pintle and said computer means to monitor the axial position of said pintle.

2. The invention as set forth in claim 1 wherein said housing forming a mixing chamber, throat portion, and nozzle portion is so configured to flow gaseous fluids in the sonic range through said venturi valve.

3. The invention as set forth in claim 1 wherein said throttling valve is used to meter gaseous propellants into rocket engines.

4. The invention as set forth in claim 3 wherein said gaseous propellants comprise gaseous oxygen and gaseous hydrogen.

5. The invention as set forth in claim 1 wherein said pintle is a contoured cone forming substantially a 60° included cone surface for flow metering said gaseous fluids through said nozzle to produce a linear change in flow rate versus axial position of said pintle.

6. The invention as set forth in claim 1 wherein said temperature sensing means is a thermocouple and said pressure sensing means is a pressure transducer.

7. The invention as set forth in claim 1 wherein said driver means connected to said stem portion is an electrical step servo motor.

8. A sonic throttling venturi valve apparatus for monitoring gaseous propellants to a rocket engine comprising:
    a housing, said housing forming a mixing chamber, throat portion, and a nozzle portion at a first end of said housing.
    a movable pintle, said pintle being a contoured cone forming substantially a 60° included cone surface for monitoring said gaseous propellant through said nozzle to produce a linear change in flow rate versus axial position of said pintle, said pintle being positioned upstream of said throat portion in said mixing chamber, said pintle further having a stem portion that extends through the second end of said housing;
    conduit means connected to said housing to direct said gaseous fluid into said mixing chamber;
    an electrical step servo motor driver means connected to said stem portion of said movable pintle to move said pintle axially into and out of said throat portion, thereby closing down or opening up the passage between said pintle and said throat portion;
    temperature thermocouple sensing means and pressure transducer sensing means in said conduit to monitor gaseous propellant upstream of said sonic throttling venturi valve;
    computer means linked to said temperature and pressure sensing means in said conduit, said computer being additionally linked to said step servo driver means to cause said driver means to move said pintle dependent upon the temperature and pressure of said upstream gaseous propellant, thereby regulating the flow of gaseous propellant through said venturi valve; and
    feedback means linked between said movable pintle and said computer means to monitor the axial position of said pintle.

* * * * *